(12) United States Patent
Ueno et al.

(10) Patent No.: US 12,742,861 B2
(45) Date of Patent: Sep. 22, 2026

(54) OPTICAL DISTANCE MEASURING DEVICE

(71) Applicant: DENSO CORPORATION, Kariya-city (JP)

(72) Inventors: Akifumi Ueno, Kariya-city (JP); Masato Rinnai, Kariya-city (JP); Fumiaki Mizuno, Kariya-city (JP)

(73) Assignee: DENSO CORPORATION, Kairya-city (JP)

( * ) Notice: Subject to any disclaimer, the term of this patent is extended or adjusted under 35 U.S.C. 154(b) by 790 days.

(21) Appl. No.: 18/298,666

(22) Filed: Apr. 11, 2023

(65) Prior Publication Data

US 2023/0243936 A1 Aug. 3, 2023

Related U.S. Application Data

(63) Continuation of application No. PCT/JP2021/038013, filed on Oct. 14, 2021.

(30) Foreign Application Priority Data

Nov. 19, 2020 (JP) ................................ 2020-192593
Oct. 8, 2021 (JP) ................................ 2021-166131

(51) Int. Cl.
*G01S 7/484* (2006.01)
*G01S 7/481* (2006.01)
*G01S 17/931* (2020.01)

(52) U.S. Cl.
CPC ............ *G01S 7/484* (2013.01); *G01S 7/4817* (2013.01); *G01S 17/931* (2020.01)

(58) Field of Classification Search
USPC ........................................................ 356/5.01
See application file for complete search history.

(56) References Cited

U.S. PATENT DOCUMENTS

| | | | | |
|---|---|---|---|---|
| 11,914,039 | B2 * | 2/2024 | Niinami | G01S 7/4815 |
| 2018/0024241 | A1 * | 1/2018 | Eichenholz | G01S 17/02 356/5.01 |
| 2018/0106903 | A1 * | 4/2018 | Iida | G01S 7/497 |
| 2019/0011544 | A1 * | 1/2019 | Gassend | G01S 7/4972 |
| 2019/0212419 | A1 * | 7/2019 | Jeong | G01S 17/08 |
| 2019/0351874 | A1 * | 11/2019 | Kim | B60S 1/566 |
| 2020/0217966 | A1 * | 7/2020 | Angus | G01S 7/4816 |
| 2022/0229164 | A1 * | 7/2022 | Steinberg | G01S 7/4863 |

(Continued)

*Primary Examiner* — Yuqing Xiao
*Assistant Examiner* — Clint Thatcher
(74) *Attorney, Agent, or Firm* — Posz Law Group, PLC

(57) ABSTRACT

An optical distance measuring device includes a light emitting part, a mirror, a scanner that scans a predetermined scanning range with an irradiation light by operating the mirror in a forward movement motion and a backward movement motion, a light receiving part that detects a reflected light returned by reflecting the irradiation light from a target existing in the scanning range, a distance calculating part that calculates a distance to the target, a timing signal generating part that generates the timing signal according to a signal from an outside of the optical distance measuring device, and a control unit that controls a light emission of the light emitting part and an operation of the scanner. The control unit synchronizes the operation of the scanner with a predetermined timing signal by adjusting a time of one cycle of the scanner while maintaining the distance measuring period of the forward movement motion.

12 Claims, 12 Drawing Sheets

(56) References Cited

U.S. PATENT DOCUMENTS

2023/0243936 A1* 8/2023 Ueno ...................... G01S 7/497
356/5.01
2023/0400557 A1* 12/2023 Noguchi ................. G01S 7/484

* cited by examiner 100
10
OPTICAL DISTANCE MEASURING DEVICE (LiDAR)
28
SCANNER
21
LIGHT EMITTING PART
30
LIGHT RECEIVING PART
a(t)
θ(t)
50
53
ANGLE COMMAND VALUE CALCULATOR
CONTROL UNIT
D+d
52
ADJUSTMENT TIME CALCULATOR
ts1
40
DISTANCE CALCULATING PART
d
60
TIMING SIGNAL GENERATING PART
DISTANCE MEASURING DATA
t
74
GNSS
72
DATA PROCESSOR 101
12
OPTICAL DISTANCE MEASURING DEVICE (LiDAR)
28
SCANNER
21
LIGHT EMITTING PART
30
LIGHT RECEIVING PART
a(t)
θ(t)
57
53
ANGLE COMMAND VALUE CALCULATOR
CONTROL UNIT
52
ADJUSTMENT TIME CALCULATOR
D+d
40
DISTANCE CALCULATING PART
ts1
ts1
d
DISTANCE MEASURING DATA
71
EXTERNAL CONTROL UNIT (ECU)
76
TIMING SIGNAL GENERATING PART
72
DATA PROCESSOR
ts1
74
GNSS
t

OPTICAL DISTANCE MEASURING DEVICE

CROSS REFERENCE TO RELATED APPLICATIONS

This application is a continuation application of International Patent Application No. PCT/JP2021/038013 filed on Oct. 14, 2021, which designated the U.S. and based on and claims the benefit of priority of two Japanese applications, Japanese Patent Application No. 2020-192593 filed on Nov. 19, 2020 and Japanese Patent Application No. 2021-166131 filed on Oct. 8, 2021. The entire disclosure of all of the above applications is incorporated herein by reference.

TECHNICAL FIELD

The present disclosure relates to an optical distance measuring device.

BACKGROUND

A plurality of vehicles are equipped with a LiDAR device, which is an optical distance measuring device.

SUMMARY

According to one aspect of the present disclosure, an optical distance measuring device is provided. An optical distance measuring device includes a light emitting part, a mirror that reflects the illumination light emitted by the light emitting part, a scanner that scans a predetermined scanning range with the irradiation light by operating the mirror in a forward movement motion and a backward movement motion, a light receiving part that detects a reflected light returned by reflecting the irradiation light from a target existing in the scanning range, a distance calculating part that calculates a distance to the target using a time from an emission of an irradiation light by the light emitting part to the detection of the reflected light from the target by the light receiving part during the forward movement motion of the mirror, and a control unit that controls a light emission of the light emitting part and an operation of the scanner. The control unit synchronizes the operation of the scanner with a predetermined timing signal by adjusting a time of one cycle of the scanner while maintaining the distance measuring period of the forward movement motion of the mirror.

BRIEF DESCRIPTION OF DRAWINGS

The above and other objects, features and advantages of the present disclosure will become more apparent from the following detailed description when taken in conjunction with the accompanying drawings. In the drawings.

DETAILED DESCRIPTION

In an assumable example, a plurality of vehicles are equipped with a LiDAR device, which is an optical distance measuring device. The LiDAR device includes an actuator that rotates the LiDAR device around its axis to adjust a direction of light projection, a communication interface that receives timing information from an external system, and a controller that causes the actuator to adjust the direction of light projection according to the received timing information so that the lights of each vehicle are kept from interfering with each other.

A timing adjustment of the LiDAR device is for adjusting the timing with the LiDAR device of another vehicle, and the timing adjustment with the other device of the own vehicle was not taken into consideration. Further, in the LiDAR device, when timing adjustment is performed during measuring a distance, in some cases, the distance measuring results were affected.

According to one aspect of the present disclosure, an optical distance measuring device is provided. An optical distance measuring device includes a light emitting part, a mirror that reflects the illumination light emitted by the light emitting part, a scanner that scans a predetermined scanning range with the irradiation light by operating the mirror in a forward movement motion and a backward movement motion, a light receiving part that detects a reflected light returned by reflecting the irradiation light from a target existing in the scanning range, a distance calculating part that calculates a distance to the target using a time from an emission of an irradiation light by the light emitting part to the detection of the reflected light from the target by the light receiving part during the forward movement motion of the mirror, and a control unit that controls a light emission of the light emitting part and an operation of the scanner. The control unit synchronizes the operation of the scanner with a predetermined timing signal by adjusting a time of one cycle of the scanner while maintaining the distance measuring period of the forward movement motion of the mirror. According to this aspect, the control unit synchronizes the operation of the scanner with the timing signal by adjusting the time of one cycle of the scanner while maintaining the distance measuring period for operating the mirror in the forward movement motion. It is possible to prevent this synchronization processing from affecting the distance measuring to the target.

First Embodiment

Figure 1:
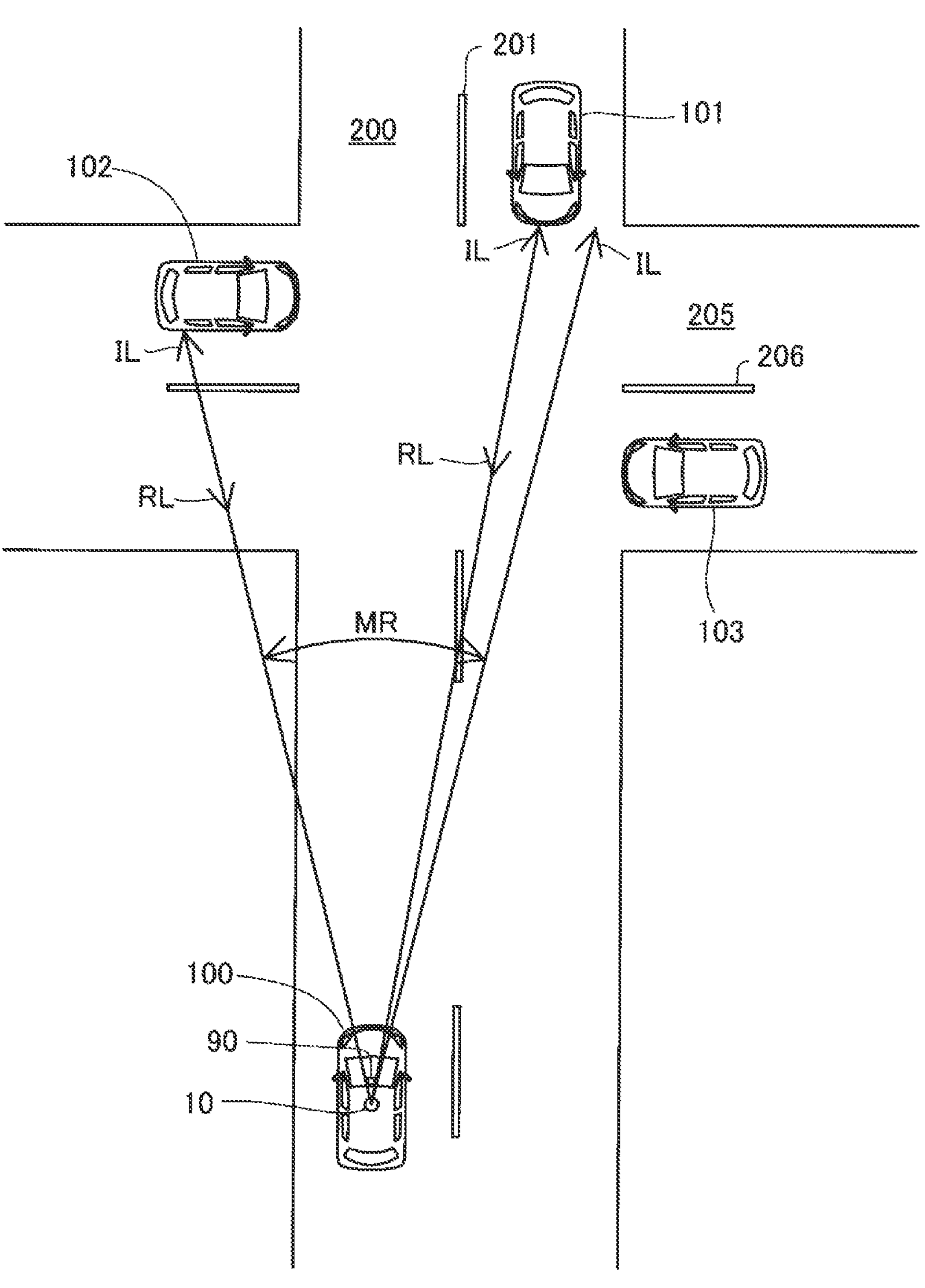
FIG. 1 is an explanatory diagram showing vehicles traveling on a road.

As shown in FIG. 1, a vehicle 100 traveling on a road 200 is equipped with an optical distance measuring device 10 and a millimeter wave radar 90, and irradiates an irradiation light IL within a scanning range MR in front of the vehicle 100 from the optical distance measuring device 10. When there is a target within the scanning range MR, the vehicle 100 receives a reflected light RL from the target. The optical distance measuring device 10 calculates a distance L to the target based on the time T from the emission of the irradiation light IL to the reception of the reflected light RL. When c is a speed of light, the distance L is calculated by ct/2. In the example shown in FIG. 1, a vehicle 101 is running on the opposite lane across a center line 201 of the road 200, and vehicles 102 and 103 are stopped on both sides of a center line 206 on a road 205 that intersects the road 200. Vehicles 101 and 102 are present within the scanning range MR, and the optical distance measuring device 10 receives reflected light RL from the vehicles 101 and 102. The millimeter wave radar 90 of the vehicle 100 scans the front of the vehicle 100 using millimeter waves and detects targets within the scanning range, similarly to the optical distance measuring device 10. At this time, by matching the scanning timing of the millimeter wave radar 90 and the scanning timing of the irradiation light IL of the optical distance measuring device 10, the direction of the vehicles 101 and 102 and the distance to the vehicles 101 and 102 can be calculated with higher accuracy.

Figure 2:
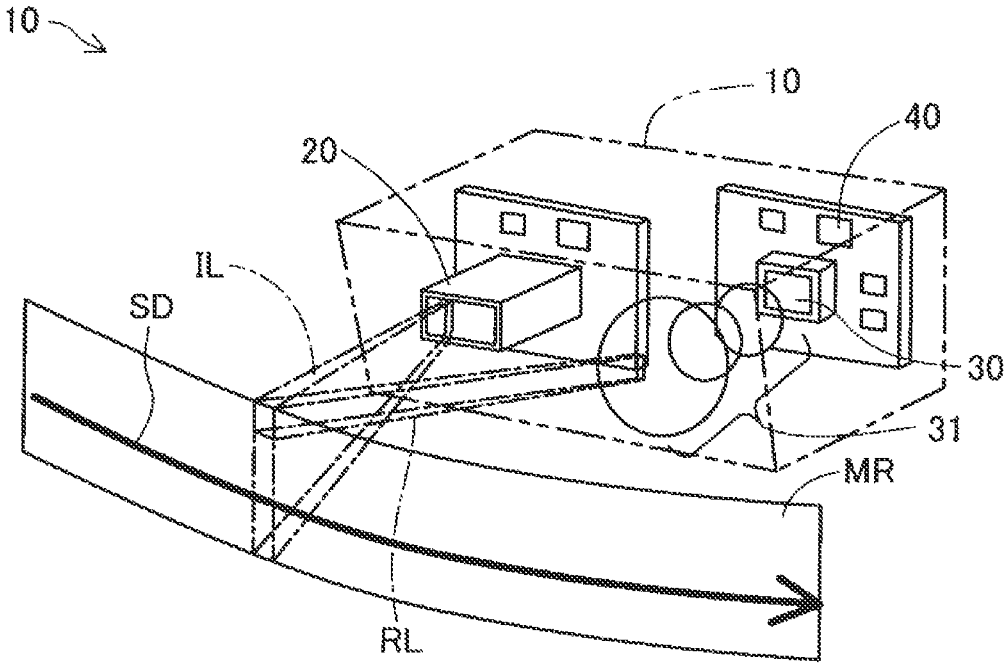
FIG. 2 is an explanatory diagram showing an optical distance measuring device.

As shown in FIG. 2, the optical distance measuring device 10 includes a light emitting unit 20, a light receiving part 30, and a distance calculating part 40. The light emitting unit 20 emits irradiation light IL and scans within a measurement range MR in the scanning direction SD. The irradiation light IL is formed in a rectangular shape whose longitudinal direction is a direction perpendicular to the scanning direction SD. The light receiving part 30 receives the reflected light RL from the range including the measurement range MR corresponding to the irradiation of the irradiation light IL through the light receiving lens 31, and outputs a signal corresponding to the light receiving state of the reflected light RL. The distance calculating part 40 uses the signal output from the light receiving part 30 to measure the distance to the target within the measurement range MR.

Figure 3:
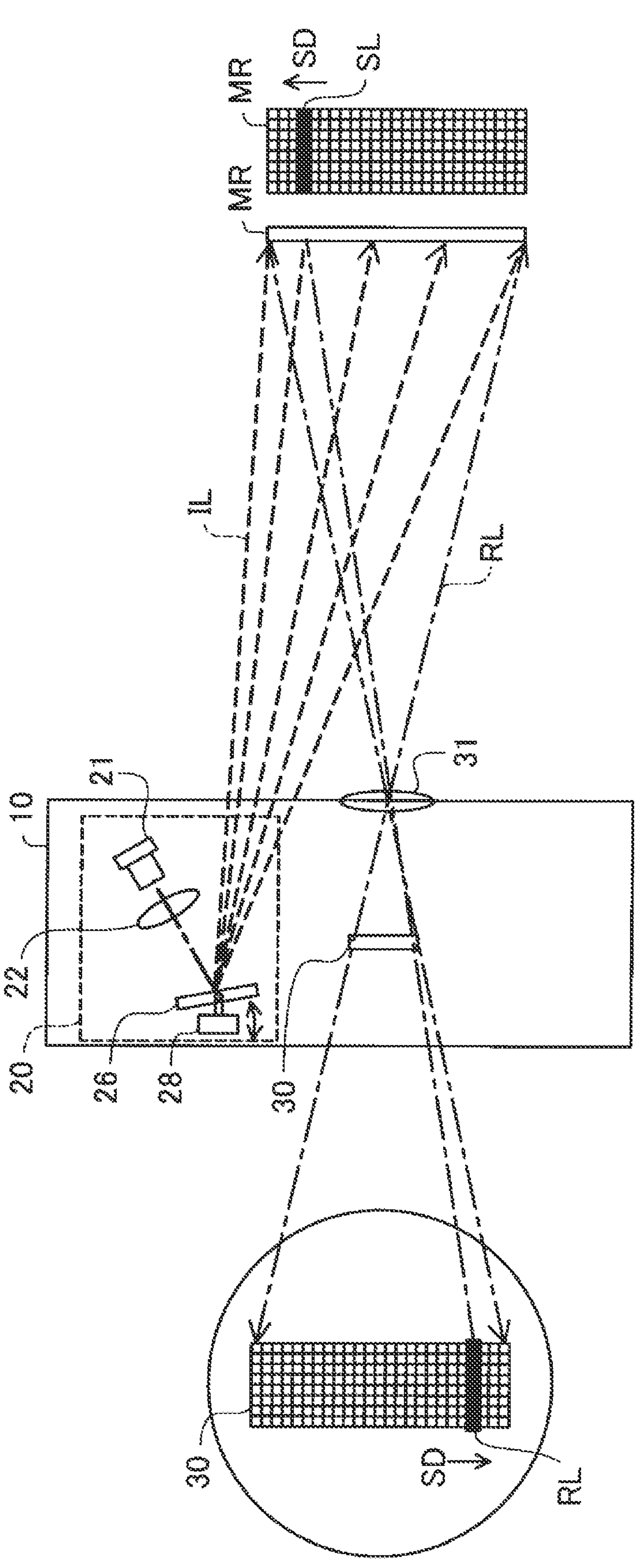
FIG. 3 is an explanatory diagram showing a process until a pulsed laser light emitted from a light emitting unit reaches a light receiving part.

A process until the pulsed laser light emitted from the light emitting unit 20 reaches the light receiving part 30 will be described with reference to FIG. 3. The light emitting unit 20 includes a light emitting part 21, a collimating lens 22, a mirror 26, and a scanner 28. The pulsed laser light emitted from the light emitting part 21 becomes an irradiation light IL having an elongated rectangular shape by the collimating lens 22. A slit may be used instead of the collimating lens 22 to form the irradiation light IL having an elongated rectangular shape. The irradiation light IL having a rectangular shape is reflected by the mirror 26 and irradiated to the outside of the optical distance measuring device 10. At this time, the scanner 28 scans the irradiation light IL in the SD direction within the measurement range MR by reciprocating the mirror 26. When a target exists within the scanning range MR, the irradiation light IL is irregularly reflected on the surface of the target and part of it returns to the optical distance measuring device 10. The reflected light RL returned from the target to the optical distance measuring device 10 is collected by the light receiving lens 31, strikes the light receiving part 30, and is detected. A distance L to the target is calculated based on the time T from when the pulsed laser light is emitted from the light emitting unit 20 until the reflected light RL is detected by the light receiving part 30.

Figure 4:
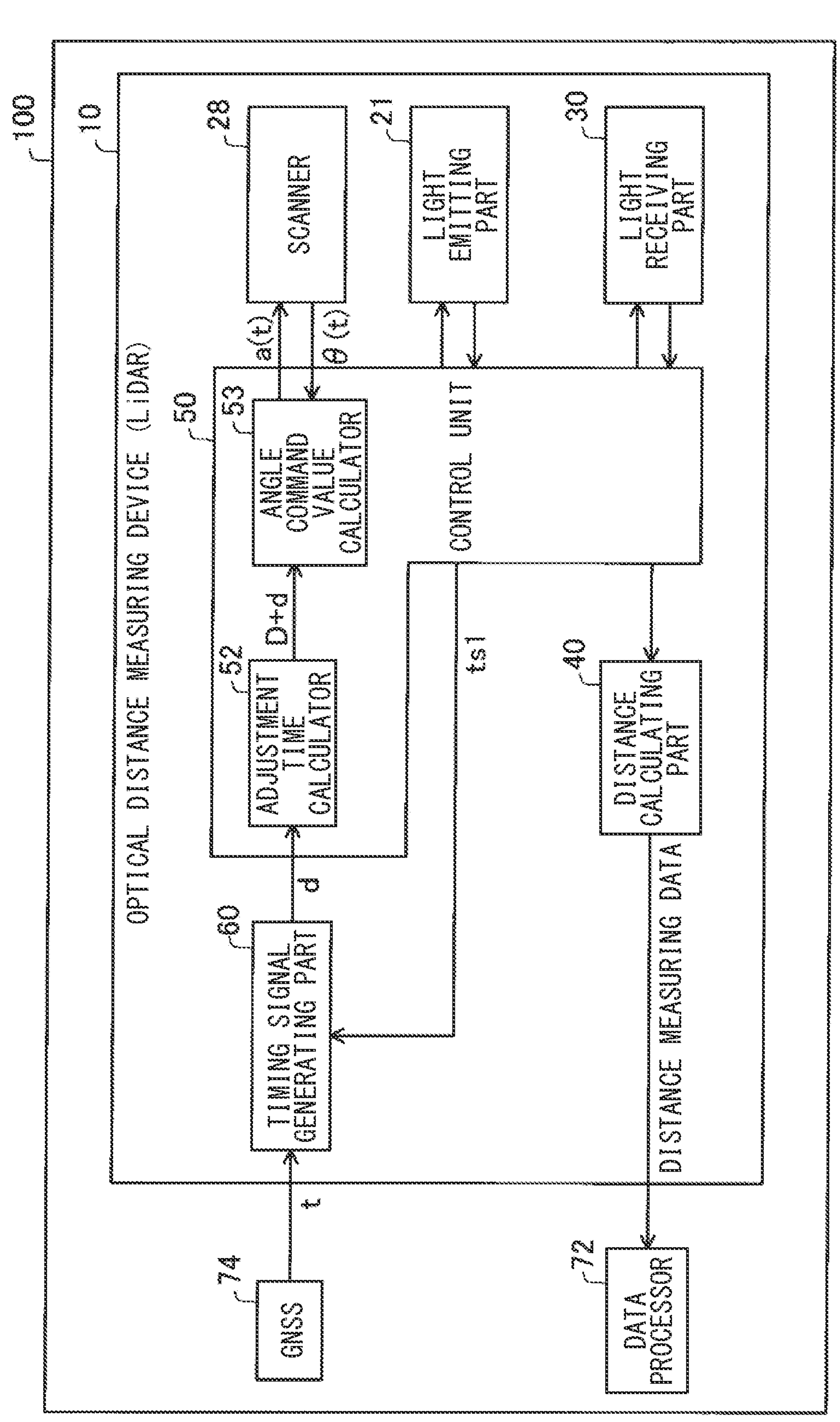
FIG. 4 is an explanatory diagram showing a block configuration of the optical distance measuring device.

FIG. 4 is an explanatory diagram showing a block configuration of the optical distance measuring device 10. The optical distance measuring device 10 includes a light emitting part 21, the scanner 28, a light receiving part 30, a distance calculating part 40, a control unit 50 and a timing signal generating part 60. A data processor 72 and a global navigation satellite system receiver 74 (GNSS) are provided external to the optical distance measuring device 10. Since the light emitting part 21, the scanner 28, the light receiving part 30, and the distance calculating part 40 have already been explained, the control unit 50, the timing signal generating part 60, the data processor 72, and the global navigation satellite system receiver 74 will be explained.

The global navigation satellite system receiver 74 receives radio waves from a plurality of satellites and calculates the current position of the global navigation satellite system receiver 74 and time t. As the global navigation satellite system, GPS of the United States, Quasi-Zenith Satellite System QZSS of Japan, GLONASS of the Russian Federation, and Galileo of the European Union are applicable.

The timing signal generating part 60 receives the time t as a signal from the global navigation satellite system receiver 74 and generates a timing signal ts at predetermined intervals. The timing signal generating part 60 receives a synchronization signal ts1 transmitted at time t0 of each cycle from the control unit 50, which will be described later. Each cycle includes two operations, forward movement and backward movement, and time t0 is the timing of switching from backward movement to forward movement. The timing signal generating part 60 generates an adjustment time d for shifting the synchronization signal ts1 so that the timing signal ts and the synchronization signal ts1 match, and sends it to the adjustment time calculator 52 described later.

The control unit 50 includes an adjustment time calculator 52 and an angle command value calculator 53. The adjustment time calculator 52 acquires the adjustment time d as adjustment time information from the timing signal generation part 60, adds the adjustment time d to a reference length D of the backward movement motion, and generates a new length D+d of the backward movement motion. The reference length D of the backward movement motion is stored in advance in the adjustment time calculator 52. How the timing signal generating part 60 obtains the adjustment time d will be described later. The angle command value calculator 53 issues an angle command a(t) for the mirror 26 corresponding to the time t to the scanner 28.

The data processor 72 performs processing using a distance measuring data output from the distance calculating part 40 and the distance measuring data of the millimeter wave radar 90 to more accurately calculate the azimuth and the distance to the target.

Figure 5:
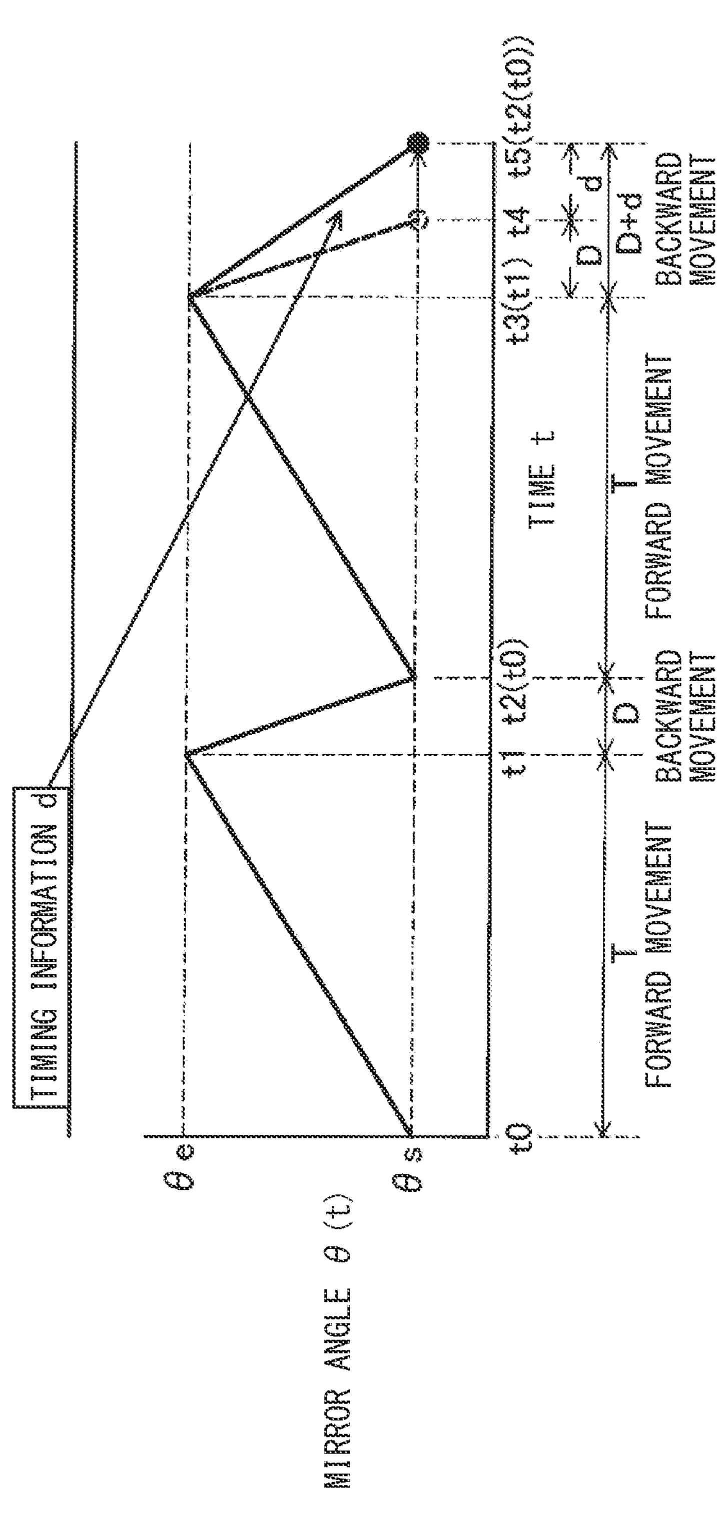
FIG. 5 is a graph showing a relationship between a time and an angle of a mirror in the optical distance measuring device.

FIG. 5 is a graph showing the relationship between the time t and the angle $\theta(t)$ of the mirror 26 in the optical distance measuring device 10. The control unit 50 causes the angle command value calculator 53 to generate an angle command a(t) for the mirror 26 corresponding to the time t so that the angle θ(t) of the mirror 26 increases from θs to θe in the forward movement motion when the time t is from t0 to t1 shown in FIG. 5, and to send the angle command a(t) to the scanner 28. The angle command value calculator 53 may acquire the mirror angle $\theta(t)$ from the scanner 28 and feedback-control the angle command a(t) by PID control or the like. The optical distance measuring device 10 measures the distance to the target during the forward movement motion from time t0 to time t1. The control unit 50 causes the angle command value calculator 53 to generate an angle command a(t) for the mirror 26 corresponding to the time t so that the angle $\theta(t)$ of the mirror 26 decreases from θe to $\theta s$ in the backward movement motion when the time t is from t1 to t2, and to send the angle command a(t) to the scanner 28. The reference length of the backward movement motion from time t1 to t2 is D as described above. The angle command value calculator 53 may similarly feedback-control the angle command a(t). The optical distance measuring device 10 does not measure the distance to the target during the backward movement motion from time t1 to t2. However, the optical distance measuring device 10 may measure the distance to the target during the backward movement motion from time t1 to t2. One cycle time from time t0 to t2 (equal to t0 of the next cycle) is about 100 ms.

When the adjustment time calculator 52 receives the adjustment time d from the timing signal generation part, the adjustment time calculator 52 calculates a time D+d for a new backward movement motion and sends it to the angle command value calculator 53. The angle command value calculator 53 sets the length from time t3 to time t5, which is the period of the backward movement motion of the next cycle, as time D+d. The angle command value calculator 53 calculates a new angle command a(t) for the mirror 26 so that the angle of the mirror 26 decreases to $\theta e$ at time t3 and to $\theta s$ at time t5, and command it to the scanner 28. As a result, the synchronization signal ts1 and the timing signal ts can be made to match after the next cycle.

As described above, according to the first embodiment, without changing the forward movement time of the mirror 26, which is the period for measuring the distance to the target, the backward movement time D of the mirror 26, which is the period during which the distance to the target is not measured, is adjusted so that the time of one cycle is adjusted. Therefore, the operation of the scanner 28 is synchronized with the timing signal ts. As a result, the timing adjustment processing executed by the control unit 50 does not affect the distance measuring result.

In the first embodiment, the period for switching from the forward movement to the backward movement or the period for switching from the backward movement to the forward movement is zero, and the backward movement time D of the mirror 26, which is the period during which the distance to the target is not measured, is adjusted so that the time of one cycle is adjusted. However, one cycle time may be adjusted by setting the length of the period for switching from the forward movement to the backward movement or the length of the period for switching from the backward movement to the forward movement as the adjustment time d.

Second Embodiment

Figure 6:
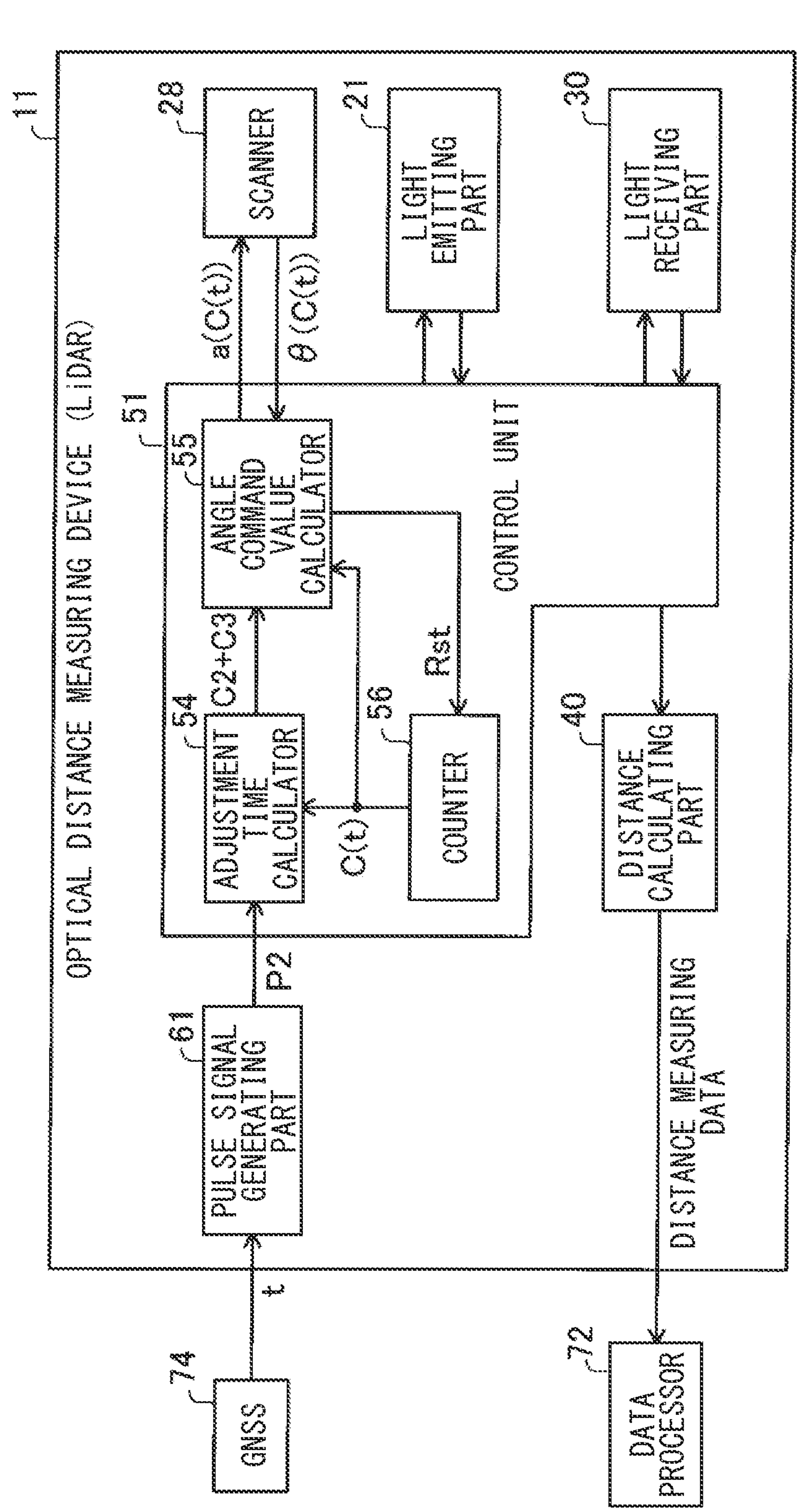
FIG. 6 is an explanatory diagram showing a block configuration of the optical distance measuring device according to a second embodiment.

FIG. 6 is an explanatory diagram showing a block configuration of the optical distance measuring device 11 according to a second embodiment. The optical distance measuring device 11 is different from the optical distance measuring device 10 of the first embodiment in that the control unit 51 includes a counter 56. Further, the operation of the adjustment time calculator 54 and the angle command value calculator 55 of the optical distance measuring device 11 is slightly different from that of the adjustment time calculator 52 and the angle command value calculator 53 of the optical distance measuring device 10 of the first embodiment. In the second embodiment, a pulse signal generating part 61 is provided outside the optical distance measuring device 11 instead of the timing signal generating part 60. In the first embodiment, the control unit 50 of the optical distance measuring device 10 acquires the adjustment time d from the outside and adjusts the operation timing of the scanner 28. However, in the second embodiment, the control unit 51 of the optical distance measuring device 11 receives a pulse signal P2 from the outside and synchronizes the operation timing of the scanner 28 with the pulse signal P2 inside the optical distance measuring device 11. Hereinafter, the differences will be described.

The pulse signal generating part 61 receives the time t as a signal from the global navigation satellite system receiver 74 and generates the pulse signal P2 at predetermined intervals. The timing signal generating part 60 of the first embodiment may be used instead of the pulse signal generating part 61, and the timing signal is may be used as the pulse signal P2.

The counter 56 is a counter that counts up at regular time intervals according to a timer (not shown) in the control unit 51, and sends the count value C(t) to the adjustment time calculator 54 and the angle command value calculator 55. In the present embodiment, the time per count 1 (one) of counter 56 is t1/C1. When the counter 56 receives the reset signal Rst from the angle command value calculator 55, the counter 56 resets the count value C(t) to zero. The adjustment time calculator 54 receives the count value C(t) from the counter 56, and receives the pulse signal P2 from the pulse signal generating part 61. The count value C(t) when the pulse signal P2 is received is set to the count value C3, and the adjustment time calculator 54 sends the sum C2+C3 of the count value C2 and the count value C3 to the angle command value calculator 55. Here, the count value C2 is the count value C(t) of the counter 56 when the angle $\theta$ of the mirror 26 returns to $\theta s$ when the backward movement time is not adjusted.

Upon receiving the count value C(t), the angle command value calculator 55 sends an angle command a(C(t)) corresponding to the count value C(t) to the scanner 28. Specifically, in the forward movement motion in which the count value C(t) is from 0 to C1, the angle command value calculator 55 increases the angle command a(t) by $(\theta e-\theta s)/C1$ each time the count value C(t) increases by 1 (one). In the backward movement motion in which the count value is from c1 to (C2+C3), the angle command value calculator 55 decreases the angle command a(t) by $(\theta e-\theta s)/(C2+C3)$ each time the count value C(t) increases by 1 (one). The angle command value calculator 55 may acquire the mirror angle $\theta(C(t))$ from the scanner 28 and feedback-control the angle command a(C(t)) by PID control or the like. The angle command value calculator 55 sends a reset signal Rst to the counter 56 when the count value C(t) reaches C2+C3.

Figure 7:
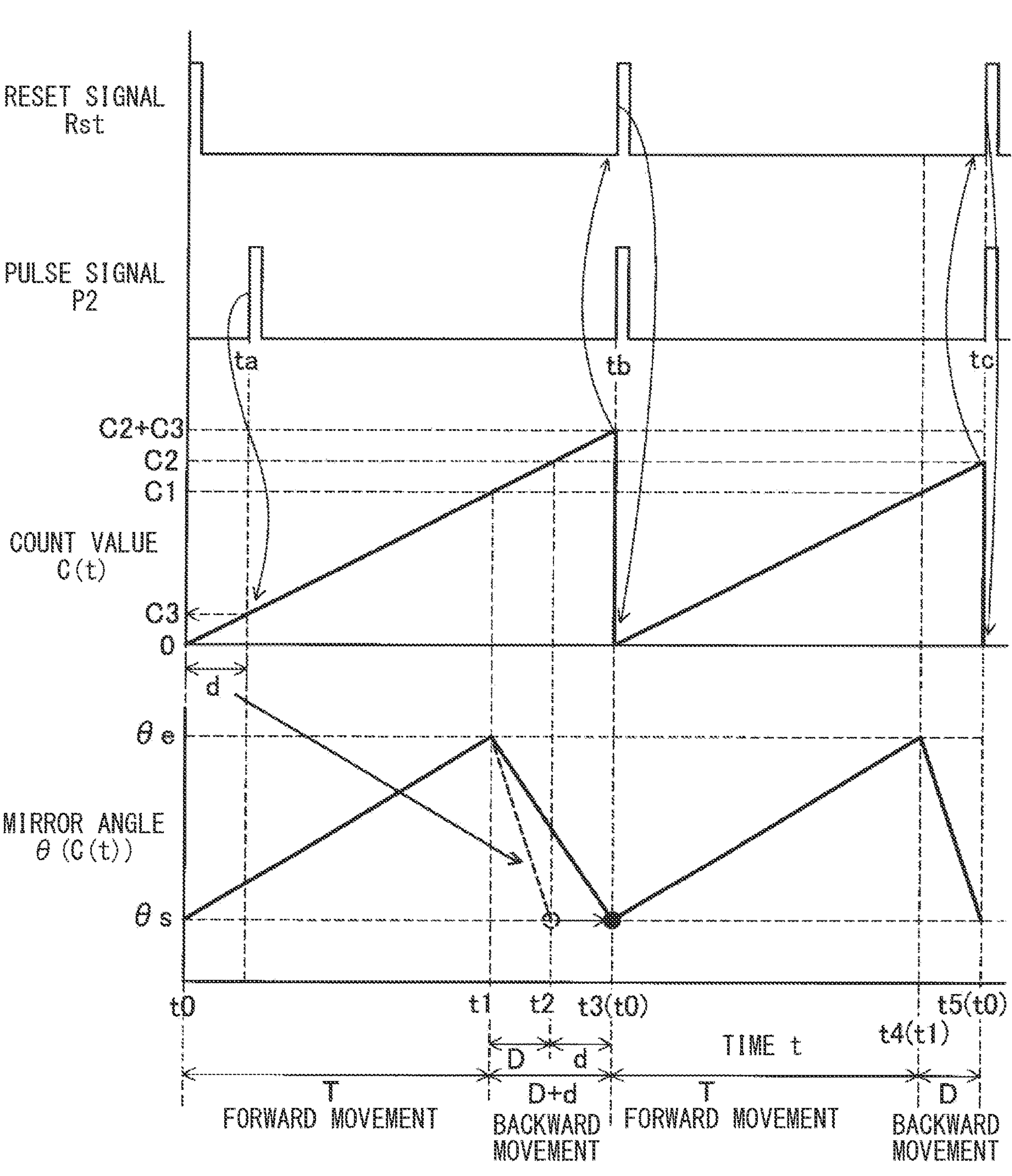
FIG. 7 is a graph showing a relationship between a time, a mirror angle, and a count value in the optical distance measuring device.

FIG. 7 is a graph showing a relationship between the time t, the angle $\theta(t)$ of the mirror 26, and the count value C(t) in the optical distance measuring device 11. At time t0, the count value C(t) of the counter 56 is 0 (zero). After that, the count value C(t) of the counter 56 is counted up at regular time intervals according to the timer in the control unit 51, and the count value C(t) of the counter 56 becomes C1 at time t1. During the period in which the count value C(t) is from 0 to C1, that is, in the forward movement motion, the angle command value calculator 55 increases the angle command a(t) by $(\theta e-\theta s)/c1$ each time the count value C(t) increases by 1 (one), and increases the mirror angle $\theta(t)$ from $\theta s$ to $\theta e$.

At time ta between times t0 and t1, the pulse signal generating part 61 in FIG. 6 generates a pulse signal P2 and sends it to the adjustment time calculator 54. The length from time t0 to ta corresponds to the adjustment time d in the first embodiment. The adjustment time calculator 54 receives the count value C(t) from the counter 56 and obtains the count value C3 when the pulse signal P2 is received. The adjustment time calculator 54 calculates C2+C3 and transmits it to the angle command value calculator 55.

At time t1, the count value C(t1) becomes C1 and the mirror angle θ(C1) becomes θe. After time t1, the angle command value calculator 55 decreases the angle command a (C(t1)) by (θe−θs)/(C2+C3) each time the count value C(t) increases by 1 (one). When the count value C3 is 0, the count value becomes C2 at time t2, and the angle command a(C(t2)) becomes θs. However, when the count value C3 is not 0, the angle command a(C(t2)) is a value between θe and θs at time t2. At time t3, the count value C(t3) becomes C2+C3 and the mirror angle θ(C2+C3) becomes θs. When the count value C(t3) reaches C2+C3, the angle command value calculator 55 transmits the reset signal Rst to the counter 56. The counter 56 resets the count value C(t) to 0 (zero) upon receiving the reset signal Rst. At time tb, the pulse signal generating part 61 generates a pulse signal P2. Here, since the time tb and the time t3 are the same timing, the count value C(tb) becomes 0 when the adjustment time calculator 54 receives the pulse signal P2. Therefore, the new count value C3 becomes 0.

At time t3 (equal to t0 of the next cycle), the adjustment time calculator 54 transmits C2+C3 to the control unit 51, but since the count value C(t) of the counter 56 is 0 when the adjustment time calculator 54 receives the pulse signal P2, C3 becomes 0. Therefore, C2+C3 transmitted from the adjustment time calculator 54 to the angle command value calculator 55 has the same value as C2. In the forward movement motion in which the count value C(t) is from 0 to C1, the control unit 51 receives the count value C(t) from the counter 56, and increases the angle command a(t) by (θe−θs)/c1 each time the count value C(t) increases by 1 (one), and increases the mirror angle θ(*t*) from θs to θe.

At time t4, the count value C(t4) becomes C1 and the mirror angle θ(t4) becomes θe. In the backward movement motion in which the count value is from C1 to C2, the angle command value calculator 55 decreases the angle command a(t) by (θe−θs)/C2 each time the count value C(t) increases by 1 (one).

At time t5, the count value C(t5) becomes C2+C3 (where C3 is 0) and the mirror angle θ(t5) becomes θs. The angle command value calculator 55 transmits the reset signal Rst to the counter 56 when the count value C(t5) reaches C2+C3 (where C3 is 0). The counter 56 resets the count value C(t) to 0 (zero) upon receiving the reset signal Rst. At time tc, the pulse signal generating part 61 generates a pulse signal P2. Here, since the time tc and the time t5 are the same timing, the count value C(tc) becomes 0 when the adjustment time calculator 54 receives the pulse signal P2. That is, the operations of the mirror 26 and the scanner 28 are synchronized with the pulse signal P2.

As described above, according to the second embodiment, the optical distance measuring device 11 has the counter 56 that counts up with the passage of time and resets the scanner 28 each time one cycle of operation is performed. The control unit 51 adjusts the time for performing the backward movement of the mirror 26 using the count value C3 of the counter 56 when the pulse signal P2 is received. According to this configuration, the time to be adjusted can be calculated inside the control unit 51 and the operation timings of the mirror 26 and the scanner 28 can be adjusted.

Third Embodiment

Figure 8:
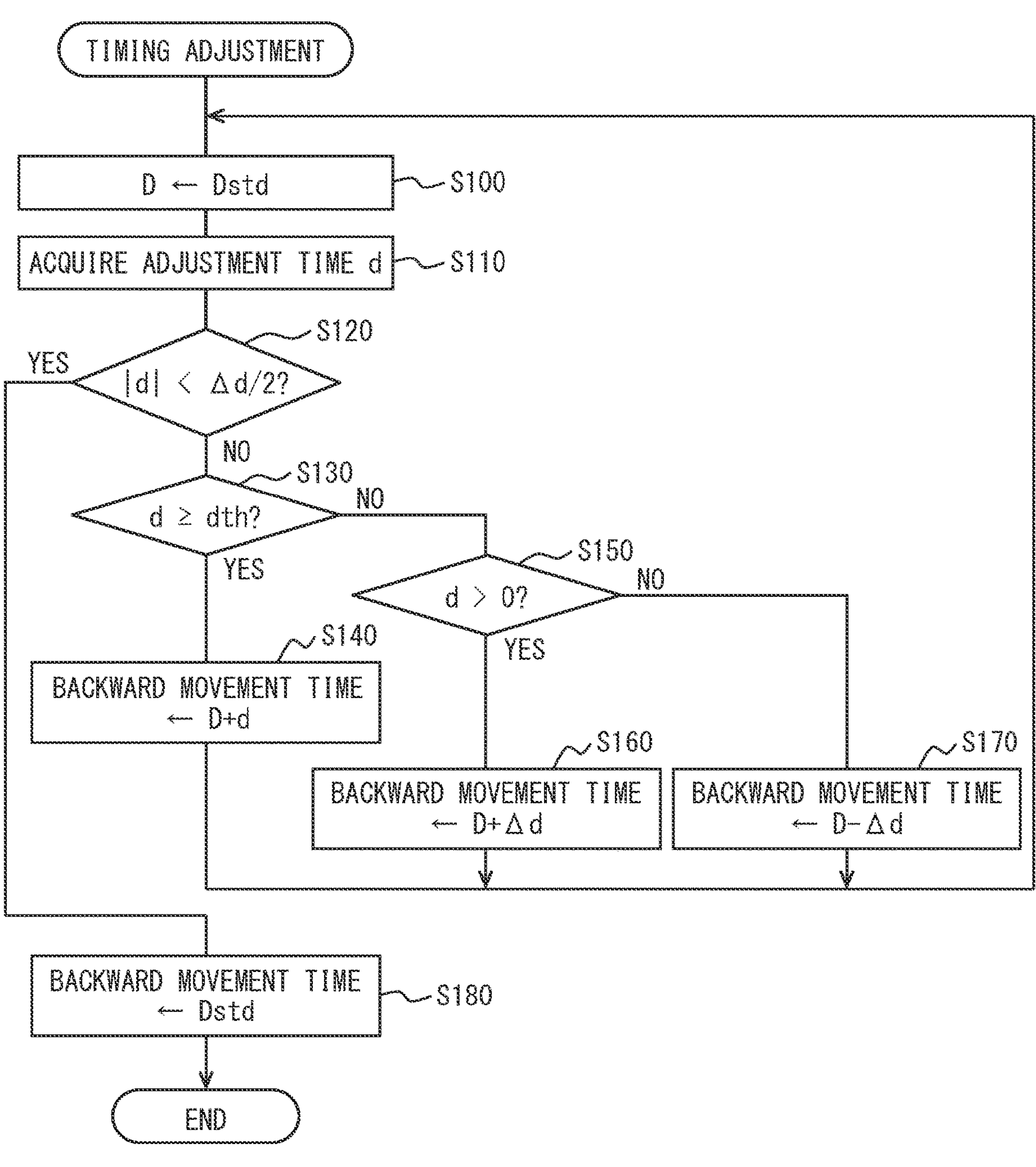
FIG. 8 is a flowchart of timing adjustment control executed by a control unit in a third embodiment.

FIG. 8 is a flowchart of timing adjustment control executed by a control unit 50 in a third embodiment. The third embodiment has substantially the same configuration as the first embodiment, but the difference is that the control unit 50 sets the backward movement time to D+d when the adjustment time d is equal to or greater than the threshold value dth, and sets the backward movement time to D+Δd (Δd has a value smaller than the threshold value dth) when the adjustment time d is less than the threshold value dth.

In step S100, the adjustment time calculator 52 of the control unit 50 substitutes the backward movement time D with a reference backward movement time Dstd. As a result, in the first step, the backward movement time D becomes equal to the reference backward movement time Dstd.

In step S110, the adjustment time calculator 52 of the control unit 50 acquires the adjustment time d from the timing signal generating part 60. In step S120, the adjustment time calculator 52 determines whether or not the absolute value of the adjustment time d is less than Δd/2. Here, Δd is a predetermined minimum adjustment time, which is an adjustment amount when adjusting the backward movement time in steps described later. In step S120, when the absolute value of the adjustment time d is less than Δd/2, the control unit 50 shifts the adjustment processing to step S180. When the absolute value of the adjustment time d is equal to or greater than Δd/2, the control unit 50 shifts the adjustment processing to step S130.

In step S130, the adjustment time calculator 52 determines whether or not the adjustment time d is equal to or greater than the threshold value dth. The control unit 50 shifts the process to step S140 when the adjustment time d is equal to or greater than the threshold dth, and shifts the process to step S150 when the adjustment time d is less than the threshold dth.

In step S140, the adjustment time calculator 52 sets the backward movement time of the next cycle to D+d. In step S150, the adjustment time calculator 52 determines whether or not the adjustment time d is greater than 0. When the adjustment time d is greater than 0, the process proceeds to step S160, and when the adjustment time d is not greater than 0, the process proceeds to step S170. The adjustment time calculator 52 sets the backward movement time of the next cycle to D+Δd in step S160, and sets the backward movement time of the next cycle to D−Δd in step S170.

Figure 9:
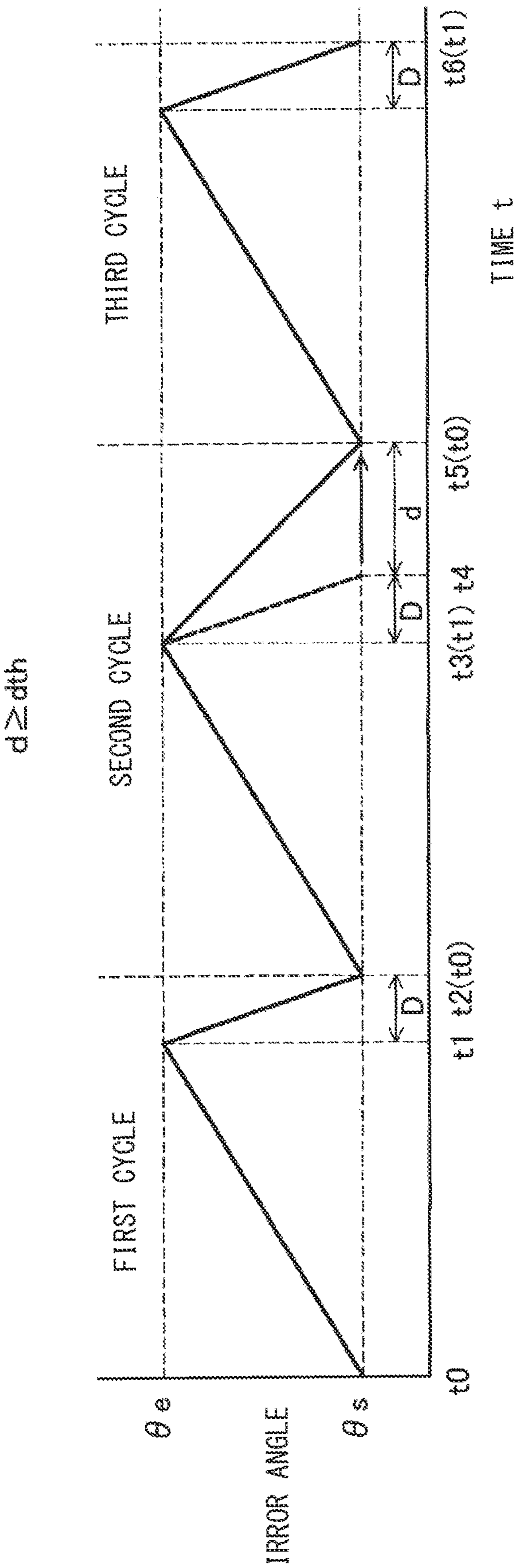
FIG. 9 is a timing chart when the adjustment time is equal to or greater than a threshold value.

FIG. 9 is a timing chart when the adjustment time d is equal to or greater than the threshold dth. In a second cycle, the adjustment time calculator 52 adjusts the timing at once by setting the backward movement time to D+d, and in a third cycle, the backward movement time is D, the timing adjustment is unnecessary.

Figure 10:
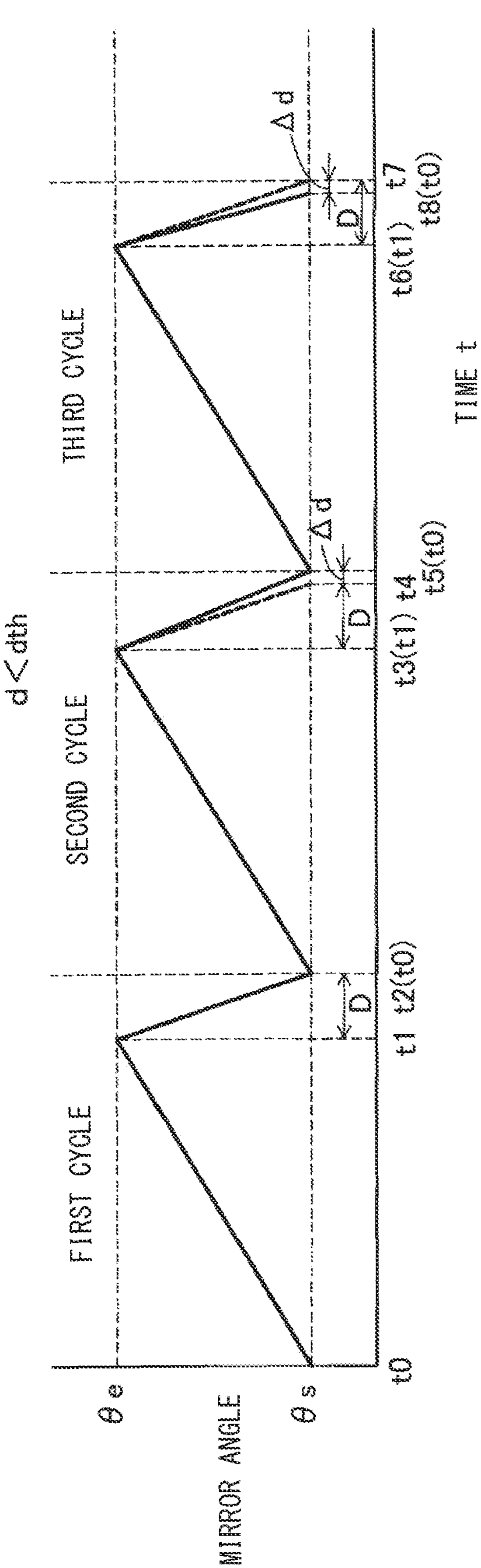
FIG. 10 is a timing chart when the adjustment time is less than the threshold value.

FIG. 10 is a timing chart when the adjustment time d is less than the threshold value dh. In the second cycle, the adjustment time calculator 52 adjusts the timing slightly by setting the backward movement time to D+Δd, and in the third cycle, the adjustment time calculator 52 adjusts the timing slightly by setting the backward movement time to D−Δd. Then the adjustment time calculator 52 adjusts the timing little by little. When adjusting the backward movement time in the direction of decreasing, there is a possibility that the distance measuring operation performed during the forward movement time will be affected. The adjustment time calculator 52 adjusts the timing by dividing the range (−Δd) that does not affect the distance measuring operation.

According to the third embodiment, the adjustment time calculator 52 switches between adjusting the timing all at once or adjusting the timing little by little depending on the length of the adjustment time d. For example, immediately after activation such as when the power switch (not shown) of the vehicle 100 equipped with the optical distance measuring device 10 is turned on, the timing signal is and the synchronization signal ts1 may deviate greatly. In this case, the adjustment time d becomes equal to or greater than the threshold dth. When such an adjustment time d is equal to or greater than the threshold value dth, the adjustment time calculator 52 sets the backward movement time to D+d, thereby adjusting all adjustment amounts collectively. On the other hand, when the other adjustment time d is less than the threshold value dth, the adjustment time calculator 52 sets the backward movement time to D+Δd or D−Δd, so that the adjustment time calculator 52 can adjust the timing by dividing it within a range (−Δd) that does not affect the distance measuring operation.

Fourth Embodiment

Figure 11:
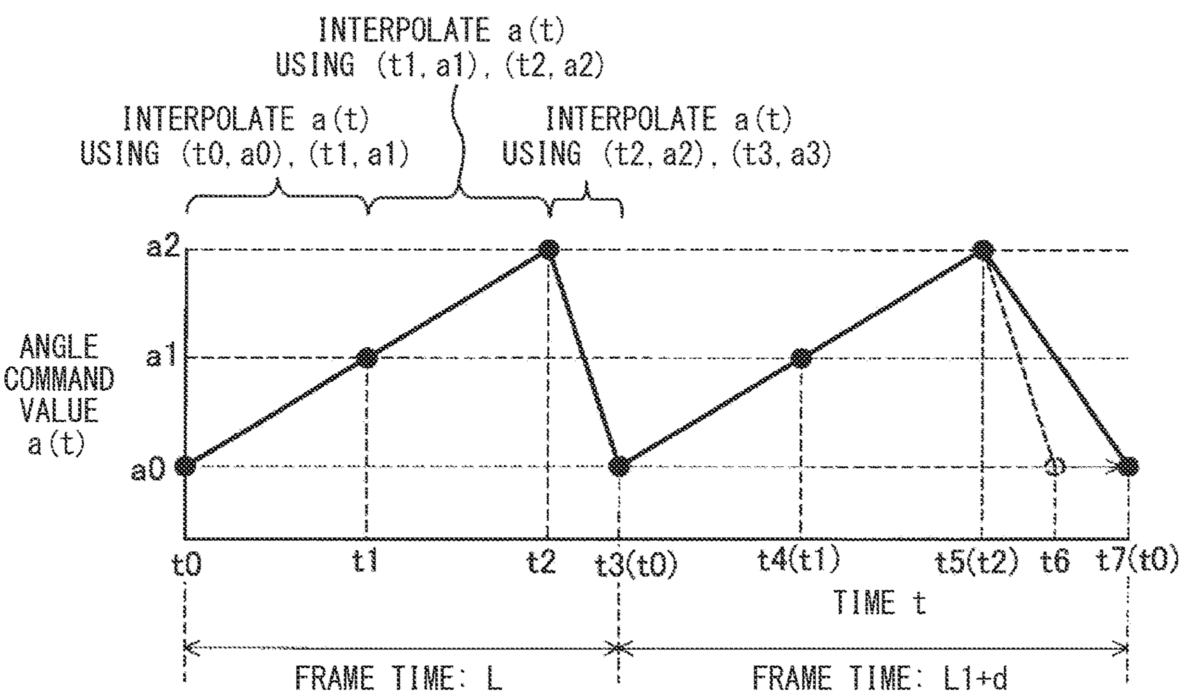
FIG. 11 is a timing chart showing a relationship between a time and an angle command value in the optical distance measuring device according to a fourth embodiment.

FIG. 11 is a timing chart showing a relationship between a time and an angle command value in the optical distance measuring device according to a fourth embodiment. In the fourth embodiment, the angle command value calculator 53 stores a data, in which several times t and angle command values a(t), for example, the times t0, t1, t2, t3 and the angle command values a(t0), a(t1), a(t2), a(t3) at times t0, t1, t2, t3 and the times t0, t1, t2, t3, are associated, in an internal storage unit (not shown). At an arbitrary time ti between the first timing t0 and the second timing t1, the angle command value calculator 53 uses the angle command values a(t0) and a(t1) at the times t0 and t1, and calculates the angle command value a(ti) by linear interpolation. Specifically, the angle command value a(ti) at time ti is calculated by the following equation (1).

$$\begin{aligned} a(ti) &= (ti - t0)\cdot\big(a(t1) - a(t0)/(t1 - t0)\big) \\ &= (ti - t0)\cdot(a1 - a0)/(t1 - t0) \end{aligned} \tag{1}$$

At time tj between times t1 and t2 and at time tk between times t2 and t3, the angle command values a(tj) and a(tk) are calculated by the following equations (2) and (3), respectively.

$$\begin{aligned} a(tj) &= a1 + (tj - t1)\cdot\big(a(t2) - a(t1)/(t2 - t1)\big) \\ &= a1 + (tj - t1)\cdot(a2 - a1)/(t2 - t1) \end{aligned} \tag{2}$$

$$\begin{aligned} a(tk) &= a2 + (tk - t2)\cdot\big(a(t2) - a(t1)/(t3 - t2)\big) \\ &= a2 + (tk - t2)\cdot(a0 - a2)/(t3 - t2) \end{aligned} \tag{3}$$

As described above, according to the fourth embodiment, the angle command value calculator 53 does not need to store the angle command values a(t) other than the times t0, t1, t2, and t3. Further, in the period of the backward movement motion, even if the time t3 at which one cycle ends changes due to timing adjustment, the angle command value at the time t can be calculated by linear interpolation. For example, according to the fourth embodiment, in the backward movement motion of the second cycle, when the adjustment time d is 0, the time t6 is the second timing. When the adjustment time d is not 0, the adjustment time calculator 52 adds or subtracts the adjustment amount d to the frame time, which is the time of one cycle, and changes the time t6, which is the second timing, to time t7. The adjustment time calculator 52 can calculate the angle command value a(t) between time t5 and time t7 by linear interpolation.

In the above-described first embodiment, the adjustment time calculator 52 is provided inside the control unit 50, but the adjustment time calculator 52 may be provided outside the control unit 50.

Fifth Embodiment

Figure 12:
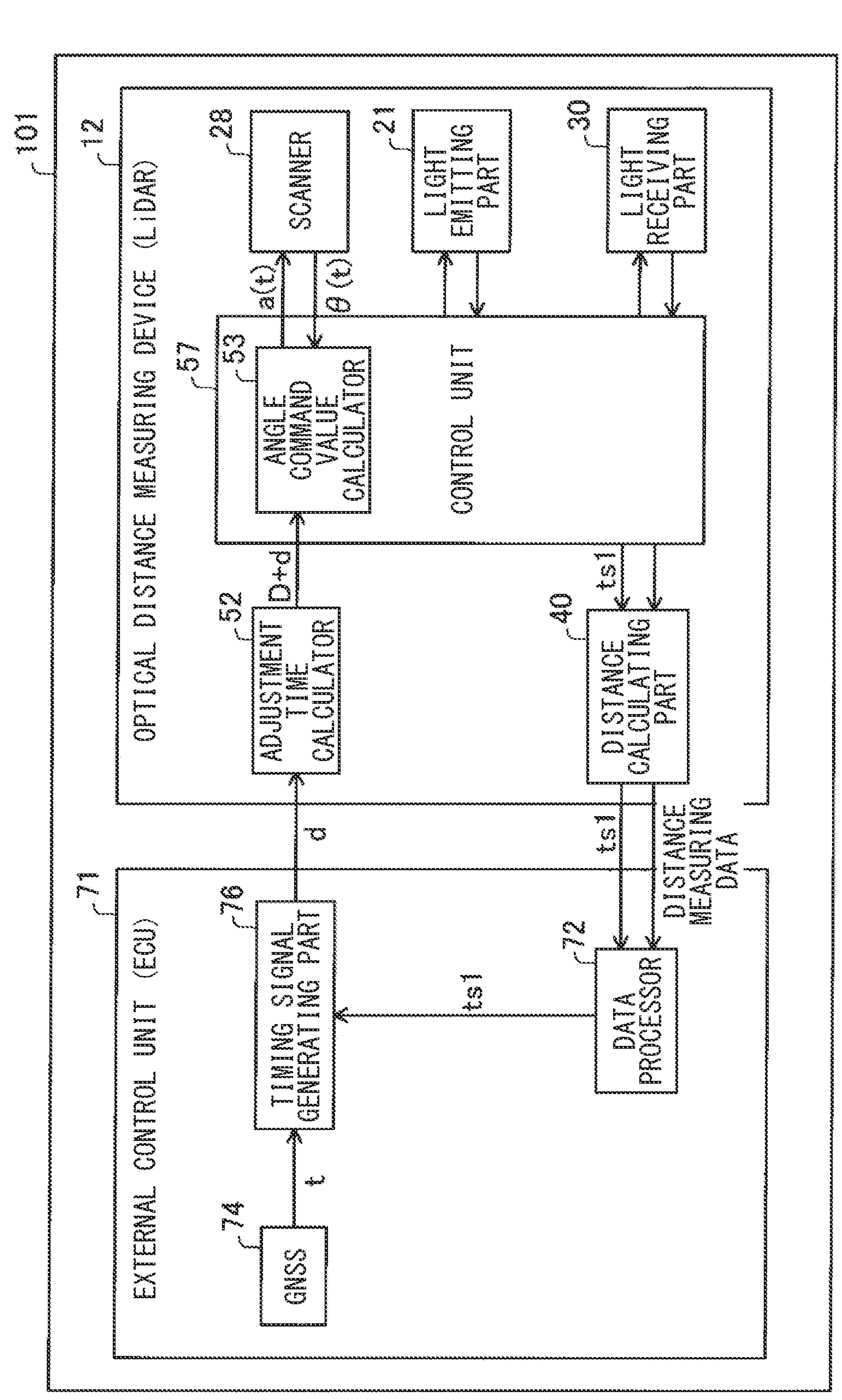
FIG. 12 is an explanatory diagram showing the block configuration of the optical distance measuring device according to a fifth embodiment.

FIG. 12 is an explanatory diagram showing the block configuration of the optical distance measuring device 12 according to a fifth embodiment. The vehicle 101 includes an optical distance measuring device 12 and an external control unit 71. The external control unit 71 includes a data processor 72, a global navigation satellite system receiver 74 (GNSS), and a timing signal generating part 76. The timing signal generating part 76 has the same function as the timing signal generating part 60 of the optical distance measuring device 10 of the first embodiment, but the configuration of the timing signal generating part 76 differs from that of the first embodiment in that it is provided in the external control unit 71. In the optical distance measuring device 12 of the fifth embodiment, the synchronization signal ts1 is transmitted to the timing signal generating part 76 of the external control unit 71 via the distance calculating part 40 and the data processor 72. The synchronization signal ts1 may be directly transmitted from the control unit 57 of the optical distance measuring device 12 to the timing signal generating part 76 of the external control unit 71. Further, the optical distance measuring device 12 is different from the optical distance measuring device 10 of the first embodiment in that the adjustment time calculator 52 is provided outside the control unit 57. However, the adjustment time calculator 52 may be provided inside the control unit 57 as in the optical distance measuring device 10 of the first embodiment.

The timing information generated by the timing signal generating part 76 may include information on the target value for adjustment by the control unit 57 of the optical distance measuring device 12 as well as time information at the time of communication. Further, the distance calculating part 40 may include time information of each distance measuring point in the distance measuring data, and the data processor unit 72 may calculate timing information from the time information.

In the optical distance measuring device 12 of the fifth embodiment, the external control unit 71 calculates the shift time required for adjusting the timing of the optical distance measuring device 12 using the driving environment of the vehicle, the operating conditions of other sensors, and the time information of each distance measuring point in the distance measuring data, and sends it. Then, the optical distance measuring device 12 receives such a shift time information and controls the scanner 28 to perform synchronization and execute timing adjustment processing.

The configuration of the fifth embodiment may be combined with any of the second to fourth embodiments. For example, in the fifth embodiment, as in the third embodiment, when the adjustment time d is equal to or greater than the threshold value dth, the control unit 57 may set the backward movement time to D+d in order to adjust the timing at once, and when the adjustment time d is less than the threshold value dth, the adjustment time calculator 52 may adjust the timing by dividing the backward movement time to D+Δd or D−Δd in a range (−Δd) that does not affect the range finding operation. Further, in the fifth embodiment, based on the adjustment time d, the external control unit 71 determines whether the timing adjustment is performed by adjusting the timing at once or the timing by dividing in a range, and instructs it. Thereafter, the control unit 57 receives the result of the determination by the external control unit 71 and may adjust the timing at once or the timing by dividing in a range.

In each of the above embodiments, the distance calculating part 40 calculates the distance to the target using the time from the emission of the irradiation light IL by the light emitting part 21 to the detection of the reflected light RL from the target by the light receiving part 30. However, the distance to the target may be calculated using a phase difference between the phase of the irradiation light IL and a phase of the reflected light RL.

In each of the embodiments described above, the period of the forward movement motion is maintained, but if the distance measuring period of the forward movement motion can be maintained, the period of the forward movement motion does not have to be maintained. This is because if the distance measuring period can be maintained, it does not affect the distance measurement.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

The control unit and the technique according to the present disclosure may be achieved by a dedicated computer provided by constituting a processor and a memory programmed to execute one or more functions embodied by a computer program. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. An optical distance measuring device, comprising:

a light emitting part;

a mirror configured to reflect an irradiation light emitted by the light emitting part;

a scanner configured to cyclically perform an operation of scanning a predetermined scanning range with the irradiation light by operating the mirror in a forward movement motion and a backward movement motion;

a light receiving part configured to detect a reflected light returned by reflecting the irradiation light from a target existing in the scanning range;

a distance calculating part configured to calculate a distance to the target during the forward movement motion of the mirror using a time from an emission of an irradiation light by the light emitting part to a detection of the reflected light from the target by the light receiving part; and a control unit configured to control a light emission of the light emitting part and an operation of the scanner, wherein the control unit synchronizes the operation of the scanner with a predetermined timing signal by adjusting a time length of one cycle of the scanner while maintaining, in the time length of the one cycle, a distance measuring period which is a period for measuring the distance to the target and which is also a period of the forward movement motion of the mirror.

2. The optical distance measuring device according to claim 1, further comprising, a timing signal generating part configured to generate the timing signal according to a signal from an outside of the optical distance measuring device.

3. The optical distance measuring device according to claim 1, wherein the control unit increases an adjustment amount of the time for operating the mirror in the backward movement at once in the time for operating the mirror in the backward movement in a next cycle, when the adjustment amount of the time for operating the mirror in the backward movement is equal to or greater than a threshold value, and increases or decreases the time for operating the mirror in the backward movement by a minimum adjustment time that is less than the threshold value in the time for operating the mirror in the backward movement in the next cycle, when the adjustment amount of the time for operating the mirror in the backward movement is less than the threshold value.

4. The optical distance measuring device according to claim 1, wherein the control unit acquires the timing signal from an external control unit provided outside the optical distance measuring device and having a timing signal generating part.

5. The optical distance measuring device according to claim 4, wherein the control unit increases an adjustment amount of the time for operating the mirror in the backward movement at once in the time for operating the mirror in the backward movement in a next cycle, when receiving an instruction for adjusting at once, and increases or decreases the time for operating the mirror in the backward movement by a minimum adjustment time in the time for operating the mirror in the backward movement in the next cycle, when receiving an instruction for adjusting by dividing.

6. The optical distance measuring device according to claim 1, wherein the control unit adjusts the time for one cycle of the scanner by adjusting the time for operating the mirror in the backward movement.

7. The optical distance measuring device according to claim 1, wherein the scanner changes an angle of the mirror according to an angle command value from the control unit.

8. The optical distance measuring device according to claim 1, further comprising, a counter configured to count up with the passage of time and be reset each time the scanner is operated for one cycle, wherein the timing signal is a pulse signal, and the control unit adjusts the time for operating the mirror in the backward movement using a count value of the counter when the timing signal is received.

9. The optical distance measuring device according to claim 1, wherein the timing signal includes adjustment time information for adjusting the time for operating the mirror in the backward movement.

10. The optical distance measuring device according to claim 1, wherein by using one cycle time, a plurality of timings including a first timing for switching the mirror from backward movement to forward movement and a second timing for switching the mirror from forward movement to backward movement, and an angle command value at the plurality of timings, the control unit calculates the angle command value at an arbitrary timing in one cycle using linear interpolation, adds or subtracts an adjustment amount of the time for operating the mirror in the backward movement to the time of one cycle, and changes the second timing.

11. The optical distance measuring device according to claim 1, wherein in the time length of the one cycle of the scanner, without changing the period of the forward movement motion of the mirror which is the distance measuring period, the control unit is configured to adjust:

(I) a period of the backward movement motion of the mirror which is a period during which the distance to the target is not measured, (II) a period for switching from the forward movement motion to the backward movement motion of the mirror, and/or (III) a period for switching from the backward movement motion to the forward movement motion of the mirror.

12. The optical distance measuring device according to claim 1, wherein the control unit is configured to adjust the time length of the one cycle by adding an adjustment time d to a reference length D of a period of the backward movement motion of the mirror which is a period during which the distance to the target is not measured, and the control unit does not change the period of the forward movement motion of the mirror which is the distance measuring period.

* * * * *